United States Patent
Zwaan et al.

(10) Patent No.: US 10,046,864 B2
(45) Date of Patent: *Aug. 14, 2018

(54) SMALL UNMANNED AERIAL VEHICLE (SUAV) SHIPBOARD RECOVERY SYSTEM

(71) Applicant: AeroVironment, Inc., Simi Valley, CA (US)

(72) Inventors: John Peter Zwaan, Simi Valley, CA (US); Robert James Johnston, Simi Valley, CA (US); Cris James Cornell, La Cresenta, CA (US); Philip Martin Finn, Westlake Village, CA (US); Glenn Arnold Blevins, Simi Valley, CA (US); David Wayne Ganzer, Simi Valley, CA (US)

(73) Assignee: AEROVIRONMENT, INC., Simi Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/581,911

(22) Filed: Apr. 28, 2017

(65) Prior Publication Data

US 2017/0291720 A1     Oct. 12, 2017

Related U.S. Application Data

(63) Continuation of application No. 14/698,770, filed on Apr. 28, 2015, now Pat. No. 9,669,947.

(Continued)

(51) Int. Cl.
*B64F 1/02* (2006.01)
*B63B 17/00* (2006.01)
(Continued)

(52) U.S. Cl.
CPC ............... *B64F 1/02* (2013.01); *B63B 17/00* (2013.01); *B64C 39/024* (2013.01); *B64F 1/025* (2013.01);
(Continued)

(58) Field of Classification Search
CPC ...... B64F 1/02; B64F 1/025; B64C 2201/205; B64C 2201/182; B64C 2201/18; B63B 35/52

See application file for complete search history.

(56) References Cited

U.S. PATENT DOCUMENTS

| 1,748,663 A | 2/1930 | Tucker |
| 3,367,608 A | 2/1968 | Charno et al. |

(Continued)

FOREIGN PATENT DOCUMENTS

| EP | 2186728 B1 | 4/2012 |
| GB | 2093414 A | 9/1982 |
| WO | WO-2007086055 A1 * | 8/2007 ................ B64F 1/02 |

OTHER PUBLICATIONS

Gooseneck (n.d.) Docitionary.com Unabridged. Retrieved Dec. 21, 2016 from Dictionary.com website http://www.dictionary.com/browse/gooseneck.

(Continued)

*Primary Examiner* — Richard R Green
(74) *Attorney, Agent, or Firm* — Pejman Yedidsion; Michael Zarrabian; Eric Aagaard

(57) ABSTRACT

Systems, devices, and methods for impacting, by a small unmanned aerial vehicle (SUAV), a net having at least three sides; and converting the kinetic energy of the SUAV into at least one of: elastic potential energy of one or more tensioned elastic cords connected to at least one corner of the net, gravitational potential energy of a frame member connected to at least one corner of the net, rotational kinetic energy of the frame member connected to at least one corner of the net, and elastic potential energy of the frame member connected to at least one corner of the net.

19 Claims, 15 Drawing Sheets

Related U.S. Application Data

(60) Provisional application No. 61/986,041, filed on Apr. 29, 2014.

(51) Int. Cl.
 *B64C 39/02* (2006.01)
 *B63B 35/52* (2006.01)

(52) U.S. Cl.
 CPC .......... *B63B 35/52* (2013.01); *B64C 2201/02* (2013.01); *B64C 2201/021* (2013.01); *B64C 2201/104* (2013.01); *B64C 2201/182* (2013.01); *B64C 2201/205* (2013.01)

(56) References Cited

U.S. PATENT DOCUMENTS

| | | | | |
|---|---|---|---|---|
| 4,143,840 A | * | 3/1979 | Bernard | B64F 1/02 244/110 C |
| 4,147,317 A | | 4/1979 | Mayhew et al. | |
| 7,611,094 B2 | | 11/2009 | Rom | |
| 8,439,301 B1 | | 5/2013 | Lussier et al. | |
| 8,453,967 B2 | | 6/2013 | Miller et al. | |
| 2008/0191091 A1 | | 8/2008 | Hoisington et al. | |
| 2009/0294584 A1 | | 12/2009 | Lovell et al. | |

OTHER PUBLICATIONS

International Search Report for U.S. Appl. No. PCT/US15/28086 dated Jul. 28, 2015.

* cited by examiner

US 10,046,864 B2

SMALL UNMANNED AERIAL VEHICLE (SUAV) SHIPBOARD RECOVERY SYSTEM

CROSS-REFERENCE TO RELATED APPLICATIONS

This application is a continuation of U.S. patent application Ser. No. 14/698,770, filed Apr. 28, 2015, which claims priority to and the benefit of U.S. Provisional Patent Application No. 61/986,041, filed Apr. 29, 2014, the contents of both of which are hereby incorporated by reference herein for all purposes.

TECHNICAL FIELD

Embodiments relate generally to systems, methods, and devices for small unmanned aerial vehicles (SUAV), and more particularly to recovery of SUAV.

BACKGROUND

Existing SUAV recovery methods include launching a smaller recovery vessel or boat from a ship to retrieve an SUAV by hand from the water, which may endanger crew aboard the vessel. Existing net-based recovery systems are overly complex. Many of these systems require substantial components. Additionally, many of these systems require special equipment, such as cranes, to set-up on ships; require substantial available ship deck space to set-up and/or operate; have to be located in areas of air turbulence generated by the ship's structure; and/or place the landing target in the vicinity of ship crew members and/or equipment, which could lead to disastrous effects in the case of a system failure.

SUMMARY

Exemplary method embodiments may include: impacting, by a small unmanned aerial vehicle (SUAV), a net having at least three sides; and converting the kinetic energy of the SUAV into at least one of: elastic potential energy of one or more tensioned elastic cords connected to at least one corner of the net, gravitational potential energy of a frame member connected to at least one corner of the net, rotational kinetic energy of the frame member connected to at least one corner of the net, and elastic potential energy of the frame member connected to at least one corner of the net. Additional method embodiments may include securing the SUAV in the net after converting the kinetic energy of the SUAV by detachable entanglement of the SUAV in the net. In additional method embodiments, securing the SUAV in the net may further include detachably entangling at least one barb in the net, wherein the at least one barb is disposed on a fuselage of the SUAV. In additional method embodiments, the frame member may be a boom. In additional method embodiments, the boom may connected to a gooseneck connector having a vertical hinge and a horizontal hinge. In additional method embodiments, at least one corner of the net may be connected to a mast at a position distal from a portion of the mast connected to the gooseneck connector. In additional method embodiments, at least one corner of the net is connected to a portion of a ship. Additional method embodiments may include removing, by a deck handler on the ship, the SUAV from the net. In additional method embodiments, retrieving the SUAV from the net may further include rotating the boom to a location proximate to an edge of a ship. In additional method embodiments, retrieving the SUAV from the net may further include lowering the mast telescopically. Additional method embodiments may include reducing, prior to impact, a closing speed of the SUAV. In additional method embodiments, reducing the speed of the SUAV further comprises cutting power to a propeller of the SUAV.

Exemplary system embodiments may include a small unmanned aerial vehicle (SUAV) recovery system including: a net having at least three corners; and a boom connected to at least one corner of the net; where energy of an impact of the SUAV into the net is progressively transferred by at least one of: a vertical rotation of the boom in a direction towards the impact of the SUAV, and a horizontal rotation of the boom in a direction away from the impact of the SUAV. In additional system embodiments, energy of the impact of the SUAV may also be transferred by deformation of the net. In additional system embodiments, energy of the impact of the SUAV may also be transferred by a progressive bending of the boom. Additional system embodiments may include: one or more tensioned elastic cords attached to at least one corner of the net; where energy of the impact of the SUAV may also be transferred by deformation of the one or more tensioned elastic cords. Additional system embodiments may include: three or more rings attached to the perimeter of the net; and three or more lines, where each side of the net may be slidably connected to one of the three or more lines by one or more of the three or more rings. Additional system embodiments may include: a mast, where the mast may be oriented perpendicular to the boom; a gooseneck connector, where the mast may be connected to the gooseneck connector by a mast connector, and where the boom may be connected to the gooseneck connector by a boom connector; a lower clamp, where the lower clamp may be connected to the gooseneck connector; and a stanchion, where the lower clamp may be attached to a stanchion. Additional system embodiments may include: an upper clamp, where the upper clamp may be disposed about an upper portion of the stanchion and a portion of the mast. In additional system embodiments, the stanchion may be on a ship, and the mast, gooseneck connector, boom, and triangular net may be disposed over an edge of the ship. In additional system embodiments, the mast and the boom may be telescopically adjustable in length. In additional system embodiments, a square mesh size of the net may be smaller than a cross-sectional size of a fuselage of the SUAV. Additional system embodiments may include: one or more barbs disposed on a fuselage of the SUAV, where the one or more barbs may be sized to detachably entangle in the net after impact.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which.

DETAILED DESCRIPTION

The present invention allows for recovery of small unmanned aerial vehicles (SUAV) aboard a ship, where kinetic energy from the SUAV is progressively transferred to a recovery system. This kinetic energy transfer may be done in a manner to reduce or minimize the deceleration that the SUAV experiences, given the size parameters of the recovery system, and thus reduce the potential for damage to the SUAV. The recovery system may be connected to a stanchion on a ship by a lower clamp connected to a gooseneck connector by a quick release system. The gooseneck connector may include a horizontal hinge, a vertical hinge, a boom connector, and a mast connector. During operation, the frame members, i.e., the mast and/or boom, may be oriented perpendicular to one another, and the boom may be perpendicular to the ship's side. A triangular net may be suspended from a tip of the boom, a tip of the mast, and a point on the ship's deck's edge. The boom, mast, and/or net may be supported by one or more stays and/or tensioned elastic cords. When an SUAV flies into the triangular net, the energy of the SUAV may be absorbed by lifting the weight of the boom vertically, via the horizontal hinge; rotating the boom horizontally towards the bow of the ship, via the vertical hinge; progressively bending the boom; deforming the elastic cords attached to the net; impacting and moving the net and/or lines attached to the net; via the air resistance of the net being moved through the air; impacting the net at an angle; the forward movement of the ship reducing the closing speed of the SUAV with the system; and/or deforming the net. The SUAV may be trapped in the triangular net by entanglement of its propeller, wingtips, one or more barbs attached to the fuselage of the SUAV, and/or any other component of the SUAV, as well as the part or whole of the SUAV, or components thereof, being enveloped by the net. The SUAV may be quickly retrieved from the net by a deck handler on the ship, without the need to deploy a small vessel or boat from the ship to retrieve the SUAV in the water.

Figure 1A:
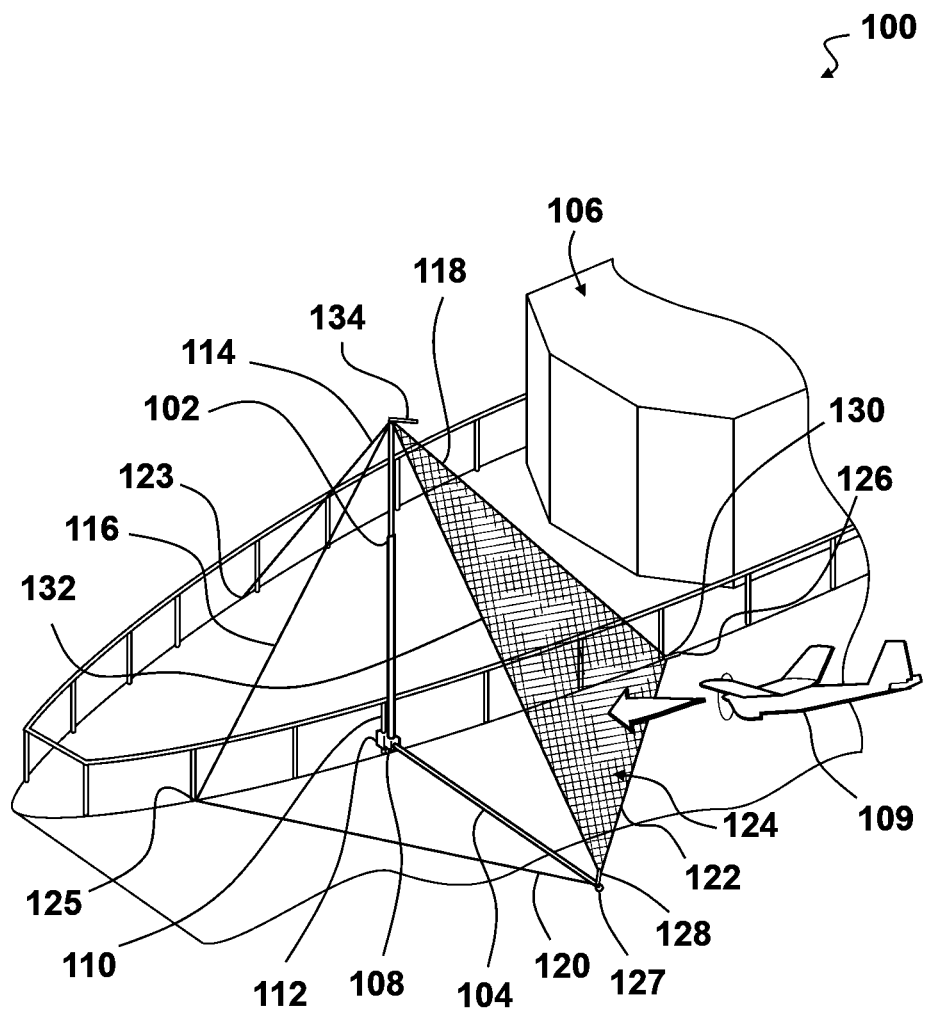
FIG. 1A depicts an exemplary embodiment of a small unmanned aerial vehicle (SUAV) shipboard recovery system.

FIG. 1A depicts an exemplary embodiment of a small unmanned aerial vehicle (SUAV) shipboard recovery system 100. The system 100 may include a mast 102 and a boom 104, which may be connected to a ship 106 by a gooseneck connector 108. The gooseneck connector 108 may be attached to a stanchion 110, e.g., a vertical railing support, on the ship 106 by a lower clamp 112. The mast 102 and/or boom 104 may be telescopically adjusted to expand and/or contract in length. In some embodiments, the mast 102 and/or boom 104 may be fixed in length. The mast 102 and/or boom 104 may be made from a flexible, non-conductive, and water resistant material, e.g., fiberglass. Any ends of the mast 102 and/or boom 104, including each telescoping end, may be reinforced, e.g., with Kevlar® by DuPont™ of Goleta, Calif., to prevent splitting from energy absorbed by the SUAV 109 impact. The SUAV 109 may be a high wing aerial vehicle, e.g., a Puma™ AE by AeroVironment, Inc. of Monrovia, Calif. The system dimensions may be modified to accommodate other SUAV types. The mast 102 may be oriented perpendicular to the ship's deck. The boom 104 may be oriented perpendicular to the ship's side. The boom 104 may be rotated to be oriented perpendicular to the mast 102 in a first position, when the system 100 is not receiving an SUAV 109. The boom 104 may also be rotated to be oriented parallel to the mast 102 (See FIG. 6) in a storage position. The mast 102 may be supported by tensioned rigging, e.g., a beam stay 114, a forestay 116, and an aft stay 118. The tensioned rigging (114, 116, 118) may be attached from a portion of the mast 102 distal from the gooseneck connector 108 to a respective location (123, 125, 126) on the deck of the ship 106. The boom 104 may held in the first position by running rigging, e.g., a drag line 120 and a lower net line 122. The running rigging (120, 122) may be connected from a portion of the boom 104 distal from the gooseneck connector 108 to a respective location (125, 126) on the deck of the ship 106. The drag line 120 and lower net line 122 may be a single continuous line, which may be threaded through an eyelet 127 disposed on the portion of the boom 104 distal from the gooseneck connector 108. In some embodiments, a trim weight (not shown) may be attached proximate to the eyelet 127. The trim weight may be used to keep the boom 104 from raising up during heavy winds. The trim weight may be increased or decreased based on the wind and/or weather conditions as needed. The running rigging (120, 122) may allow the boom 104 to swing, e.g., towards the bow relative to the ship 106, in response to impact by an SUAV 109 in a second position.

The system 100 may also include a net, such as a triangular net 124. In other embodiments, the net may have more than three sides and varying shapes. The triangular net 124 may be suspended between the portion of the mast 102 distal from the gooseneck connector 108, the portion of the boom 104 distal from the gooseneck connector 108, and a portion of the ship 106 via a ship net connector 126. One or more corners of the triangular net 124 may be attached by one or more elastic cords (128, 130), e.g., bungee cords. In some embodiments, all corners of the net may be attached by one or more elastic cords. The elastic cords (128, 130) may be tensioned by pulling in the drag line 120. A net line 132 may be integrated into the triangular net 124 between the mast 102 and the boom 104. The lower net line 122 may be integrated into the triangular net 124 between the boom 104 and the ship net connector 126. The aft stay 118 may be integrated into the triangular net 124 between the mast 102 and the ship net connector 126. The triangular net 124 may be inclined such that the portion of the triangular net 124 proximate to the mast 102 slopes away from the portion of the triangular net 124 proximate to the lower net line 122. The slope of the triangular net 124 may prevent the SUAV 109 from falling out of the triangular net 124 after impact, and may act to reduce loads on the SUAV by impacting the net at an angle. In some embodiments with barbs attached to the fuselage of the SUAV (See FIGS. 3A-3B), the net may be aligned at, or near, a vertical orientation relative to the ship's deck. The portion of the mast 102 distal from the gooseneck connector 108 may include one or more sensors and/or indicators, e.g., a wind indicator 134, which may be used by an operator of the SUAV 109 for reference in accurately guiding the SUAV 109 into the triangular net 124.

The system 100 may be disposed over the side of the ship 106 and above the water. The positioning of the system 100 takes up no, or minimal, deck space on the ship 106. The location of the system 100 also reduces the effects of turbulence, which may be caused by air moving over one or more ship structures while the ship is in motion. The reduced turbulence may result in the triangular net 124 holding its shape and increased maneuverability of the SUAV 109 as it approaches the system 100 for landing.

Figure 1B:
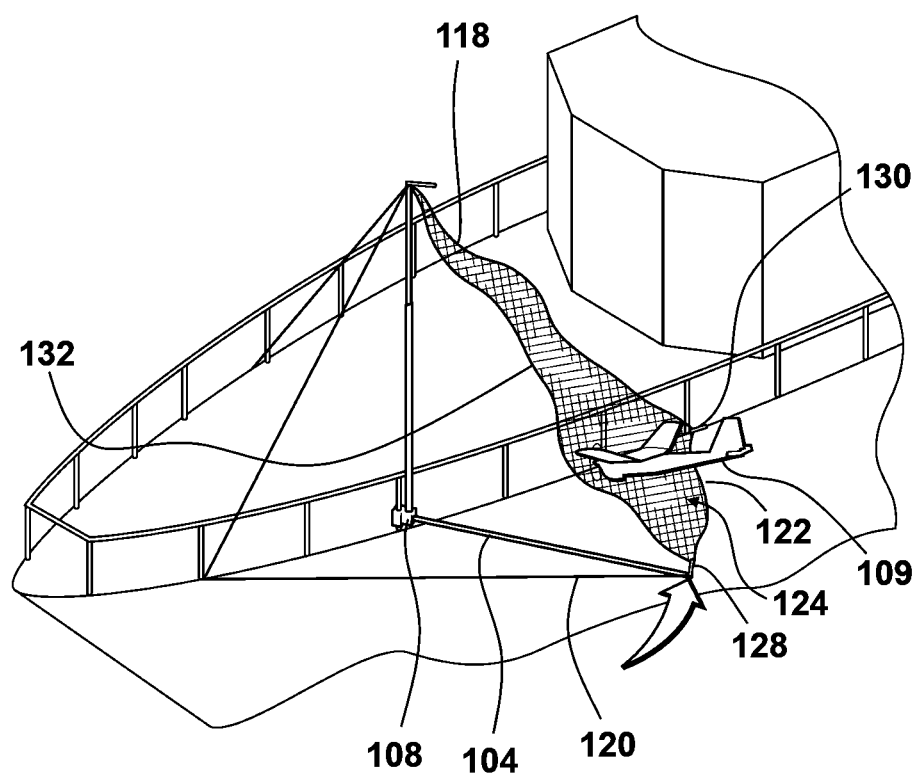
FIG. 1B depicts the exemplary SUAV shipboard recovery system of FIG. 1A where a SUAV impacts a recovery net causing the boom to swing up to absorb the energy from the impact of the SUAV.

FIG. 1B depicts the exemplary SUAV shipboard recovery system of FIG. 1A where the SUAV 109 impacts the triangular net 124 causing the boom 104 to swing up to absorb the energy from the impact of the SUAV 109. As the SUAV 109 impacts the triangular net 124, the energy from the SUAV 109 is absorbed by moving and/or deforming the triangular net 124; deforming the one or more tensioned elastic cords (128, 130) connected to at least one corner of the triangular net 124; lifting the weight of the boom 104; rotating the weight of the boom 104 towards the bow of the ship; bending the boom 104; deforming the aft stay 118, lower net line 122, and/or net line 132; and/or deforming the drag line 120. The SUAV 109 impact may convert the kinetic energy of the SUAV 109 into at least one of: increased momentum of the net; air drag of the net; elastic potential energy of the one or more tensioned elastic cords (128, 130), gravitational potential energy of the boom 104, rotational kinetic energy of the boom 104, and elastic potential energy of the boom 104. The SUAV 109 velocity is self-modulated by the height to which the boom 104 is lifted, rotated, and/or bent. The boom 104 may swing and/or bend towards the bow relative to the ship 106 to absorb additional energy, e.g., during impact of the SUAV 109 in the second position. The boom 104 may be self-centered to the first position, perpendicular to the ship's side, by action of the gooseneck connector 108, drag line 120, and/or lower net line 122.

Figure 1C:
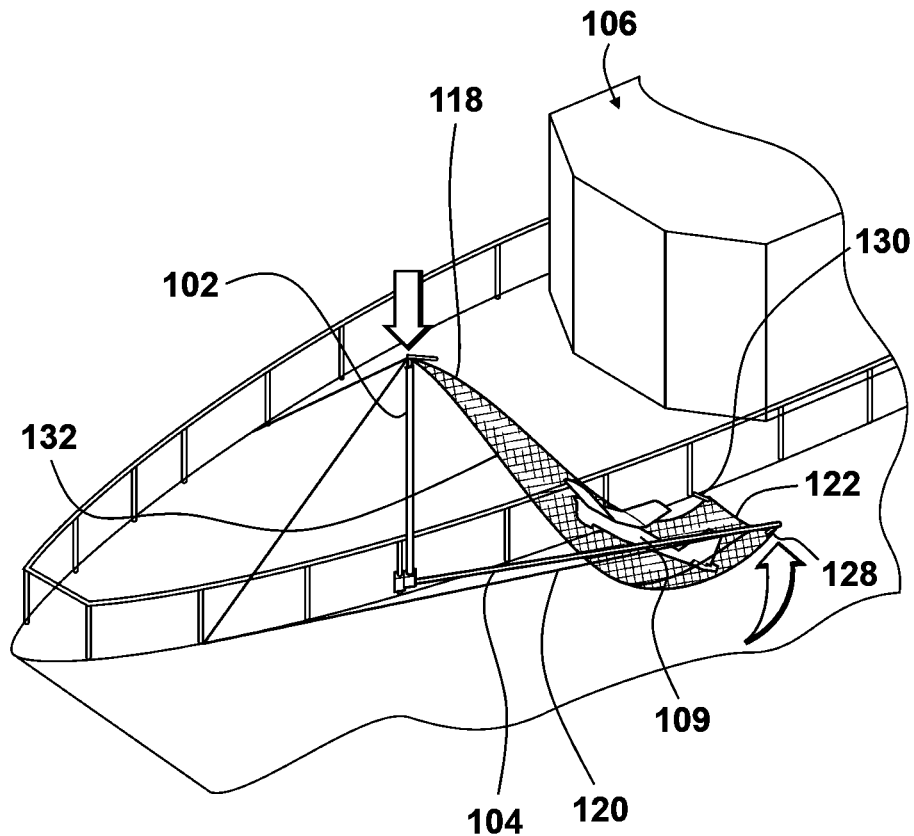
FIG. 1C depicts the exemplary shipboard recovery system of FIGS. 1A-1B where the boom drag line is eased and the mast is lowered to allow removal of the SUAV by a person on the ship.

FIG. 1C depicts the exemplary shipboard recovery system of FIGS. 1A-1B where, after the SUAV 109 has substantially come to rest in the net 124, the boom drag line 120 is eased and the mast 102 is lowered to allow removal of the SUAV 109 by a person, e.g., deck handler, on the ship 106. Once the SUAV 109 is secured in the triangular net 124, e.g., by entanglement and/or envelopment of the SUAV 109 and/or one or more of its components and/or barbs, the drag line 120 may be let out to allow the boom 104 to rotate aftward relative to the ship 106, until the boom 104 is proximate to the ship's deck's edge. The mast 102 may be lowered telescopically and/or the boom 104 may be shortened telescopically, as needed, to assist in safe removal of the SUAV 109 from the triangular net 124. Once the SUAV 109 is removed, the system may return to its first position by pulling in the drag line 120, extending the telescoping mast 102, and/or extending the telescoping boom 104 in order to re-tension the one or more elastic cords (128,130) and/or the aft stay 118, lower net line 122, and/or net line 132. The position of the boom 104 may be self-centering in the first position before or after impact of the SUAV 109.

Figure 1D:
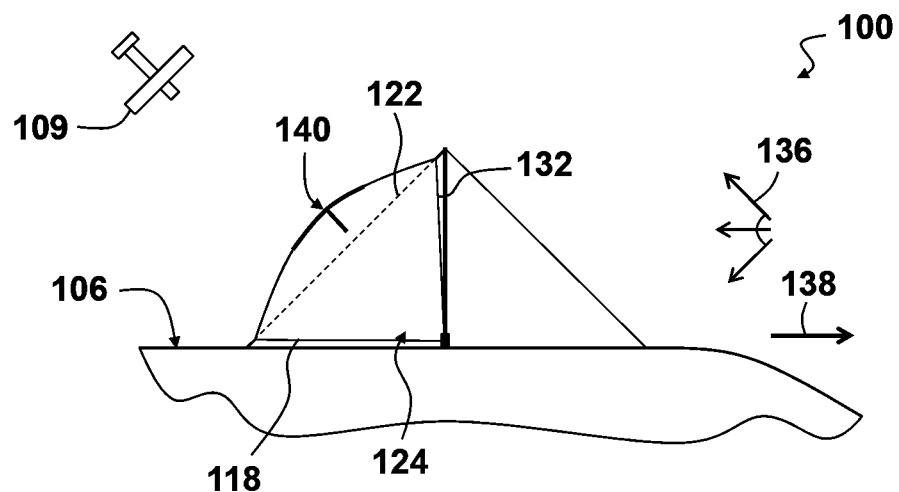
FIG. 1D depicts a top view of the exemplary shipboard recovery system as the net billows outwards due to wind and the closing speed of the SUAV is reduced.

FIG. 1D depicts a top view of the exemplary shipboard recovery system 100 as the triangular net 124 billows outwards due to the wind direction 136, and the closing speed of the SUAV 109 is reduced. The shipboard recovery system 100 may progressively transfer the energy of the SUAV 109 impact. The lower net line 122 is depicted with dashed lines. The triangular net 124 is supported on each side by a corresponding line (118, 122, 132). The entire shipboard recovery system 100 may be disposed over the side of the ship 106 so as to not use any, or minimal, deck space. The position of the shipboard recovery system 100 may also reduce turbulence caused by one or more structures on the ship blowing over the triangular net 124. The ship may be moving in a forward direction 138, which may oppose any one of a number of wind directions 136. This movement of the ship and/or wind direction 136 may cause the triangular net 124 to billow outwards. A visual target 140, e.g., a solid material having a thickness greater than that of the net material, may be located in a center of the triangular net 124. The visual target 140 may have increased wind resistance and assist in creating the billowing shape of the triangular net 124. It may be desirable to reduce the closing speed of the SUAV 109 prior to impact with the shipboard recovery system 100. An optimum closing speed may be, for example, 12 meters/second. The engine of the SUAV 109 may be switched off prior to impact to further reduce the closing speed, e.g., by cutting power to a propeller of the SUAV 109.

Figure 1E:
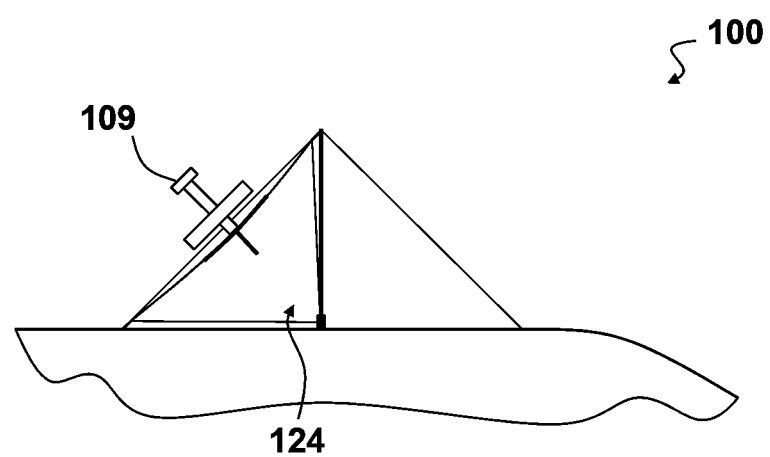
FIG. 1E depicts a top view of the exemplary shipboard recovery system of FIG. 1D as the net is deformed due to SUAV impact.

FIG. 1E depicts a top view of the exemplary shipboard recovery system 100 of FIG. 1D as the triangular net 124 is deformed due to SUAV 109 impact. The recovery system 100 may progressively transfer the energy of the SUAV 109 impact. Energy may be transferred by a deformation of the triangular net 124 as it is deformed from its initial, billowing, state. The triangular net 124 may continue to deform until resistance is met.

Figure 1F:
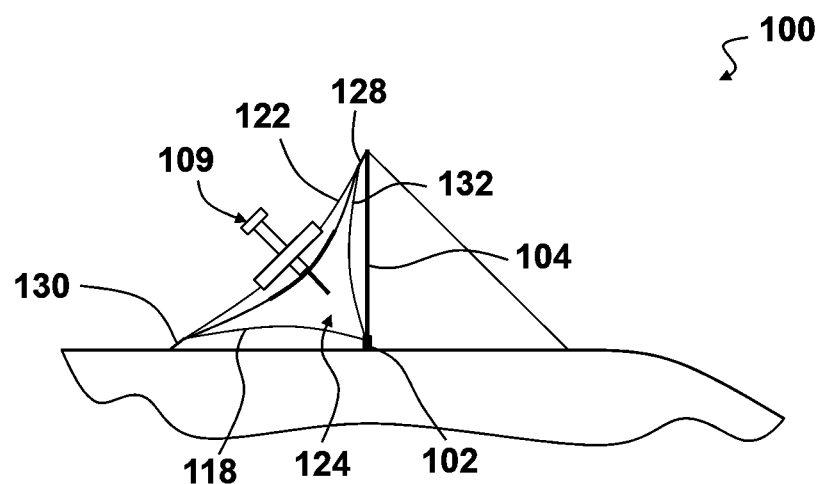
FIG. 1F depicts a top view of the exemplary shipboard recovery system of FIGS. 1D-1E as the impact of the SUAV causes deformation of the elastic cords and lines connected to the net.

FIG. 1F depicts a top view of the exemplary shipboard recovery system 100 of FIGS. 1D-1E as the impact of the SUAV 109 causes deformation of the elastic cords (128,

130) and lines (118, 122, 132) connected to the net. Upon deformation of the triangular net 124, the one or more elastic cords (128, 130) may be deformed to continue to progressively transfer the energy of the SUAV 109 impact. By transferring the energy via the elastic cords (128, 130), the boom 104 and/or mast may be protected from forces that may cause them to shatter or otherwise fail. The lines (118, 122, 132) surrounding the triangular net 124 may also deform as the energy of the SUAV 109 impact is progressively transferred to the system 100.

Figure 1G:
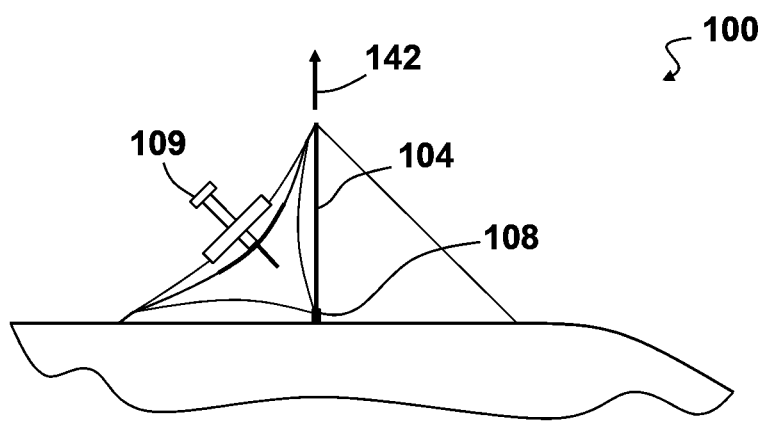
FIG. 1G depicts a top view of the exemplary shipboard recovery system of FIGS. 1D-1F as the impact of the SUAV causes the boom to lift vertically and progressively bend.

FIG. 1G depicts a top view of the exemplary shipboard recovery system 100 of FIGS. 1D-1F as the impact of the SUAV 109 causes the boom to lift 142 vertically relative to the ship's deck, and progressively bend. The boom 104 may lift vertically via a horizontal hinge in the gooseneck connector 108. The height to which the weight of the boom is lifted may dynamically vary based on the energy of the SUAV 109 impact to be transferred. The boom 104 may also progressively bend in response to the SUAV 109 impact, where the end of the boom may bend first, followed by a bending and/or lifting of the boom 104 proximate to the gooseneck connector 108.

Figure 1H:
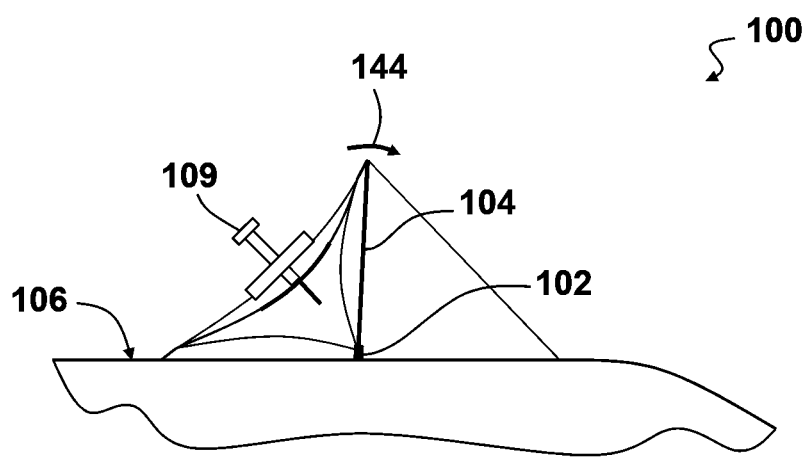
FIG. 1H depicts a top view of the exemplary shipboard recovery system of FIGS. 1D-1G as the impact of the SUAV causes the boom to rotate horizontally towards the bow of the ship.

FIG. 1H depicts a top view of the exemplary shipboard recovery system 100 of FIGS. 1D-1G as the impact of the SUAV 109 causes the boom 104 to rotate 144 horizontally relative to the ship's deck towards the bow of the ship 106. The rotation 144 of the boom may be to convert additional kinetic energy from the SUAV 109 impact and prevent damage to the boom 104 and/or mast 102. Accordingly, each element of the system 100 described in FIGS. 1D-1H acts to progressively absorb the impact of the SUAV 109.

Figure 2A:
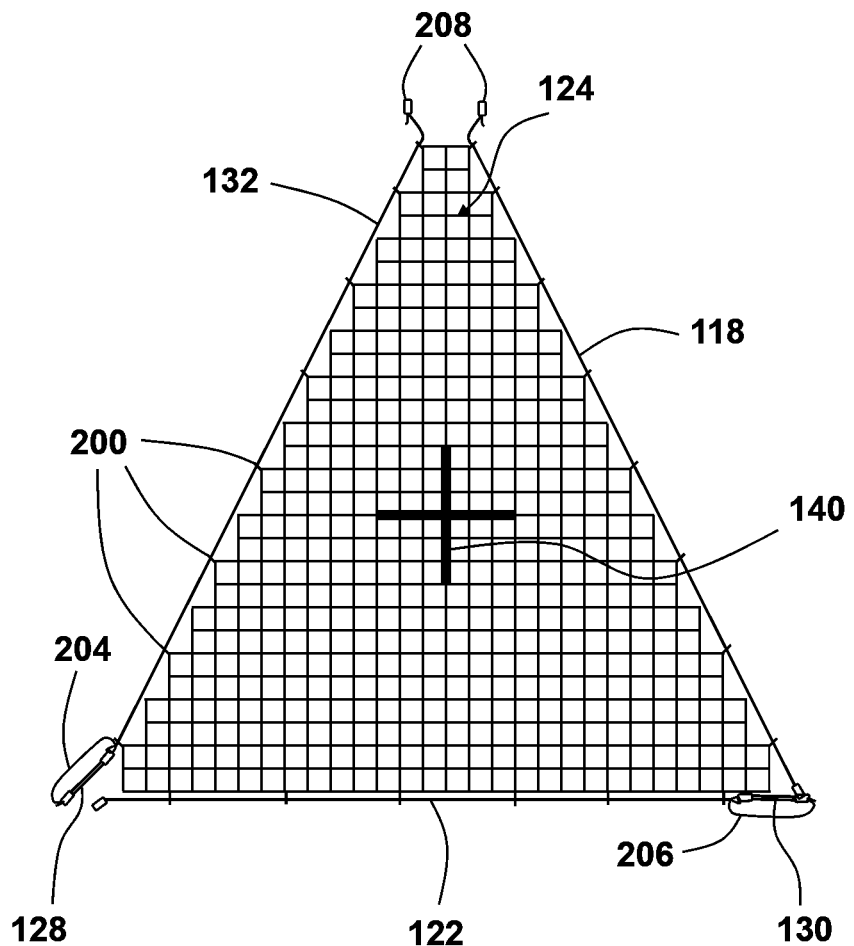
FIG. 2A depicts an exemplary net having lines secured to each side of the net and elastic cords secured to one or more corners of the net.

FIG. 2A depicts the exemplary triangular net 124 having lines (118, 122, 132) secured to each side of the net and elastic cords (128, 130) secured to one or more corners of the triangular net 124. Three or more rings 200 may be attached to the perimeter of the triangular net 124 and the lines (118, 122, 132) may be slidably connected to the triangular net 124 by being threaded through these rings. The triangular net 124 may have a square mesh shape with a perpendicular orientation of the mesh, although other shapes and orientations may be used. The square mesh size may be smaller than the cross-sectional size of the fuselage of the SUAV, so that the SUAV fuselage does not squeeze through the triangular net 124 upon impact. The square mesh size should be large enough so as to minimize the weight of the triangular net 124 and reduce the effects of windage on the triangular net 124. The triangular net 124 may be made from an ultra-high-molecular-weight polyethylene (UHMWPE, UHMW) such as Dyneema®. UHMWPE has extremely low moisture absorption and a very low coefficient of friction, is self-lubricating, and is highly resistant to abrasion. The UHMWPE may have a small diameter to limit the effect of weight and/or windage, e.g., 1.2 mm in diameter.

The triangular net 124 may include a visual target 140, e.g., a cross near the center of the triangular net 124. The visual target 140 may be used as a visual reference as the triangular net 124 may appear practically transparent due to its thin material and/or surrounding environment. The triangular net 124 may be located off the side of the ship so that it does not take up deck space and may not be in direct line of the ship crew and/or equipment in case of a failed landing. The location of the triangular 124 off the side of the ship may also reduce the wind turbulence created by the structure of the ship. The mesh of the triangular net 124 may capture the SUAV by detachable entanglement of one or more components of the SUAV, e.g., propeller, wingtips, fuselage, sensors, etc. The mesh of the triangular net 124 may also capture the SUAV 109 by detachable entanglement of one or more barbs disposed on a fuselage of the SUAV 109 (See FIGS. 3A-3B). The slope of the triangular net 124 may be approximately forty-five degrees to ensure that the SUAV does not exit the triangular net 124 after impact and to reduce the impact of the SUAV. The weight of the SUAV may be cradled in the triangular net 124 after impact. In some embodiments with barbs connected to the fuselage of the SUAV, the slope of the triangular net 124 may be at, or near, vertical.

The triangular net 124 may have one or more elastic cords (128, 130) secured to one or more corners of the triangular net 124. Each elastic cord (128, 130) may be bundled together, e.g., two or more substantially parallel elastic cords held together with silicon tape, and connected to a corresponding line (132, 122). The corresponding lines (132, 122) may each have a corresponding check line (204, 206) for when the elastic cords (128, 130) stretch to their maximum length and/or fail. The ends of each line (118, 122, 132) may have a detachable attachment 208, e.g., a carabiner, for attaching to a portion of the ship, boom, and/or mast.

Figure 2B:
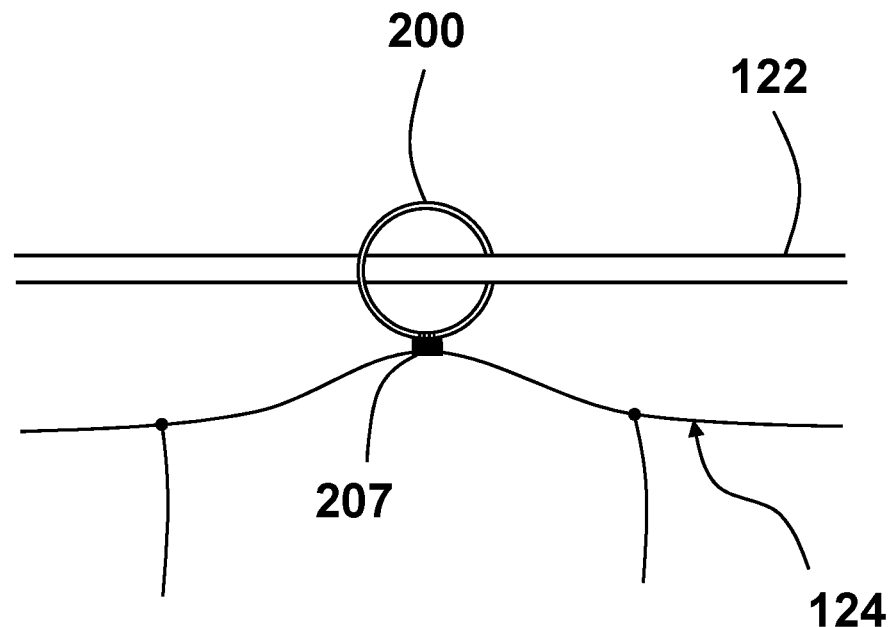
FIG. 2B depicts an exemplary ring secured to a side of the net for attachment to a line along the side of the net.

FIG. 2B depicts an exemplary ring 200 secured to a side of the triangular net 124 for attachment to a line along the side of the net. The ring 200 may be attached 207, e.g., via knotted net material, to the perimeter of the triangular net 124 at a set spacing, e.g., one ring 200 per foot. A line, such as the lower net line 122, may be threaded through these rings 200 so that the triangular net 124 may move freely relative to the lower net line 122, e.g., when setting up the system or upon impact of the SUAV. The ring may be made from a material having low friction, e.g., Teflon® by DuPont™, so that the triangular net 124 may deform upon without compromising the line structure. By allowing the net to move freely relative to the lines, via the rings 200, the system may absorb more energy from the SUAV impact and a system failure, e.g., breaking of the mast and/or boom, may be prevented.

Figure 3A:
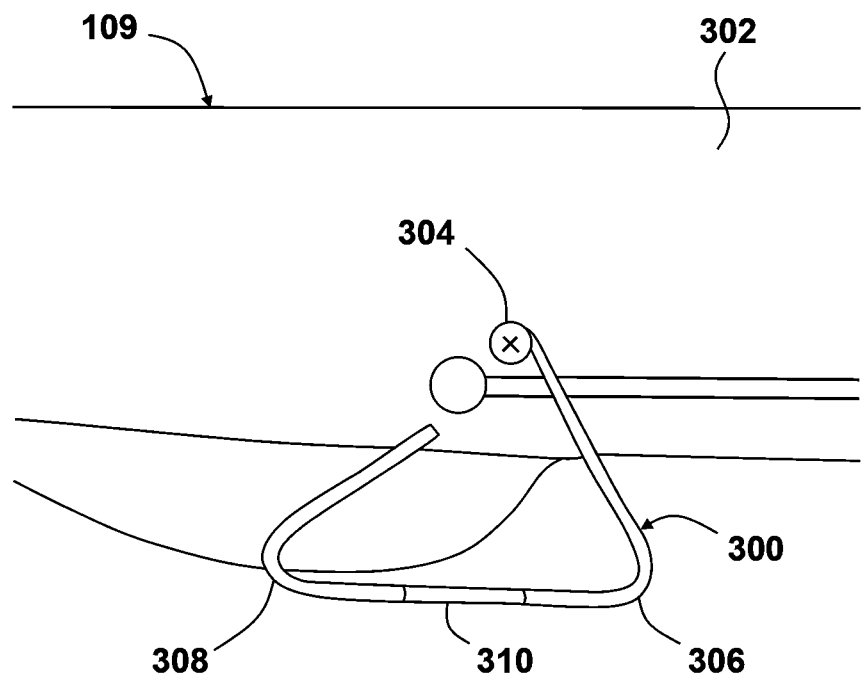
FIG. 3A depicts a side view of an exemplary barb secured to a fuselage of the SUAV.

FIG. 3A depicts a side view of an exemplary barb 300 secured to a fuselage 302 of the SUAV 109. One or more barbs 300 may be attached to the fuselage 302 of the SUAV 109. The barb 300 may be detachably attached, e.g., by a screw 304, to the fuselage 302. In some embodiments, the barb 300 may be fixedly attached to the SUAV 109. The barb may have a first bend 306 and a second bend 308 to allow the barb 300 to catch on the net upon impact and prevent the SUAV 109 from falling out of the net. In some embodiments, the barb may have a marker 310, e.g., colored tape, so that a deck handler can easily identify the barb 300 and detach it from the net after impact.

Figure 3B:
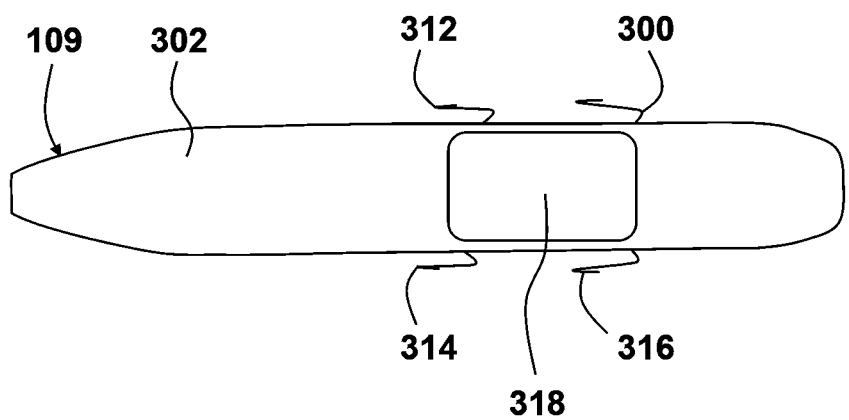
FIG. 3B depicts a top view of four exemplary barbs secured to the fuselage of the SUAV near and about the center of mass of the SUAV.

FIG. 3B depicts a top view of four exemplary barbs (300, 312, 314, 316) secured to the fuselage 302 of the SUAV 109 near, and/or about, a center of mass 318 of the SUAV 109. An SUAV may be equipped with one or more barbs (300, 312, 314, 316). These barbs (300, 312, 314, 316) may be placed near, and/or about, the center of mass 318, e.g., location of an SUAV battery, of the SUAV 109 so as to increase the likelihood of the barbs (300, 312, 314, 316) attaching to the net after impact, and not changing the center of gravity location and/or balance of the SUAV 109 when added thereto. In some embodiments, the barbs (300, 312, 314, 316) may be placed on other components on the SUAV, e.g., wing tips, tails, etc. The location of the barbs (300, 312, 314, 316) should avoid interference with other SUAV 109 components, e.g., cameras, sensors, etc.

Figure 4A:
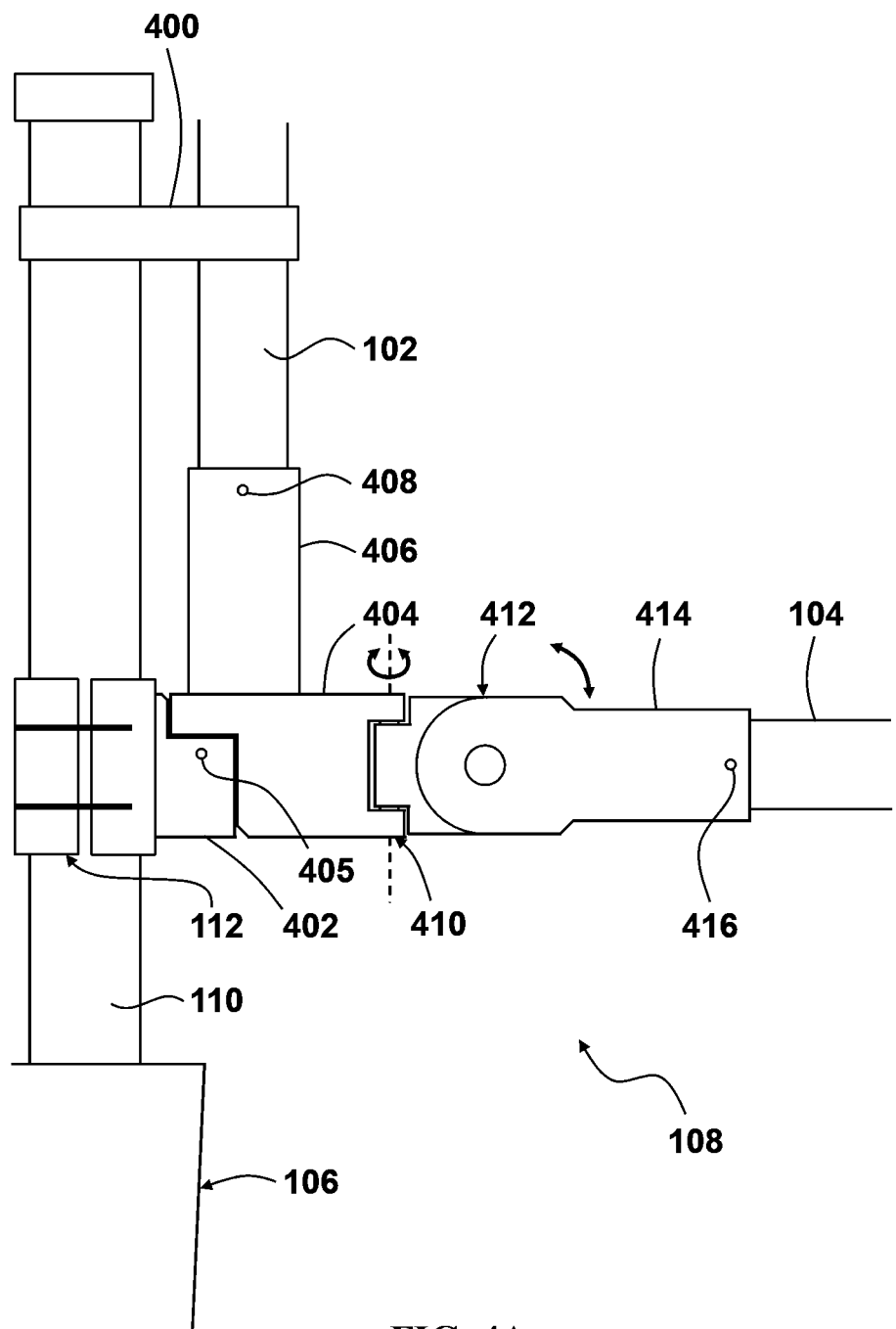
FIG. 4A depicts an exemplary gooseneck connector attached to a ship stanchion by a lower clamp and an upper clamp with the boom extended away from the ship.

FIG. 4A depicts the exemplary gooseneck connector 108 attached to a ship 106 stanchion 110 by a lower clamp 112 and an upper clamp 400 with the boom 104 extended away from the ship 106. The gooseneck connector 108 may be detachably attached to the ship 106 stanchion 110 by the lower clamp 112. In some embodiments, the lower clamp 112 may be a bracket. The lower clamp 112 may include a clamp quick release block 402, which may receive a gooseneck connector quick release block 404 (See FIGS. 5A-5B). The lower clamp 112 may be attached to a stanchion 110. Then, the gooseneck connector quick release block 404 may be detachably attached to the clamp quick release block 402. The weight of the gooseneck connector 108, mast 102, boom 104, and other components of the system do not need to be on the lower clamp 112 as the lower clamp 112 is being attached. An individual may attach the lower clamp 112 to the stanchion 110 without requiring assistance in supporting the rest of the weight of the system. Once the lower clamp 112 is attached, the rest of the system may be attached via the quick release connection, secured with a quick release pin 405, between the clamp quick release block 402 and the gooseneck connector quick release block 404. In some embodiments, the gooseneck connector 108 may be directly connected to the lower clamp 112. In other embodiments, an alternative connection between the lower clamp 112 and gooseneck connector 108 may be used.

A mast connector 406 may be connected to the gooseneck connector quick release block 404. The mast connector 406 may receive the mast 102. The mast connector 406 may secure the mast 102 via a mast connector pin 408. Once the gooseneck connector 108 is attached to the stanchion 110, a deck hand may attach an upper clamp 400 around the stanchion 110 and mast 102. The upper clamp 400 may provide additional stability to the system, especially during upright storage (See FIG. 6). The upper clamp 400 may be made from a thermoplastic such as polyoxymethylene (POM) having high stiffness, low friction, and dimensional stability, e.g., Delrin® by DuPont™. In some embodiments, the upper clamp 400 may be further secured with an elastic cord. The upper clamp 400 may have infinite height adjustment along the stanchion 110 relative to the lower clamp 112. The upper clamp 400 may be positioned to avoid objects on the stanchion 110, e.g., a lifeline connected to the stanchion 110. A maximum possible distance between the upper clamp 400 and the lower clamp 112 is optimal for support of the system.

The gooseneck connector 108 may include a vertical hinge 410 and a horizontal hinge 412. A boom connector 414 may be connected to the horizontal hinge 412. The boom connector 414 may receive the boom 104. The boom connector 414 may secure the boom 104 via a boom connector pin 416. The vertical hinge 410, having a vertical axis of rotation relative to the pin position, may allow the boom 104 to rotate horizontally, from aft to stern, relative to the ship's deck. The horizontal hinge 412, having a horizontal axis of rotation relative to the pin position, may allow the boom 104 to rotate vertically relative to the ship's deck.

Figure 4B:
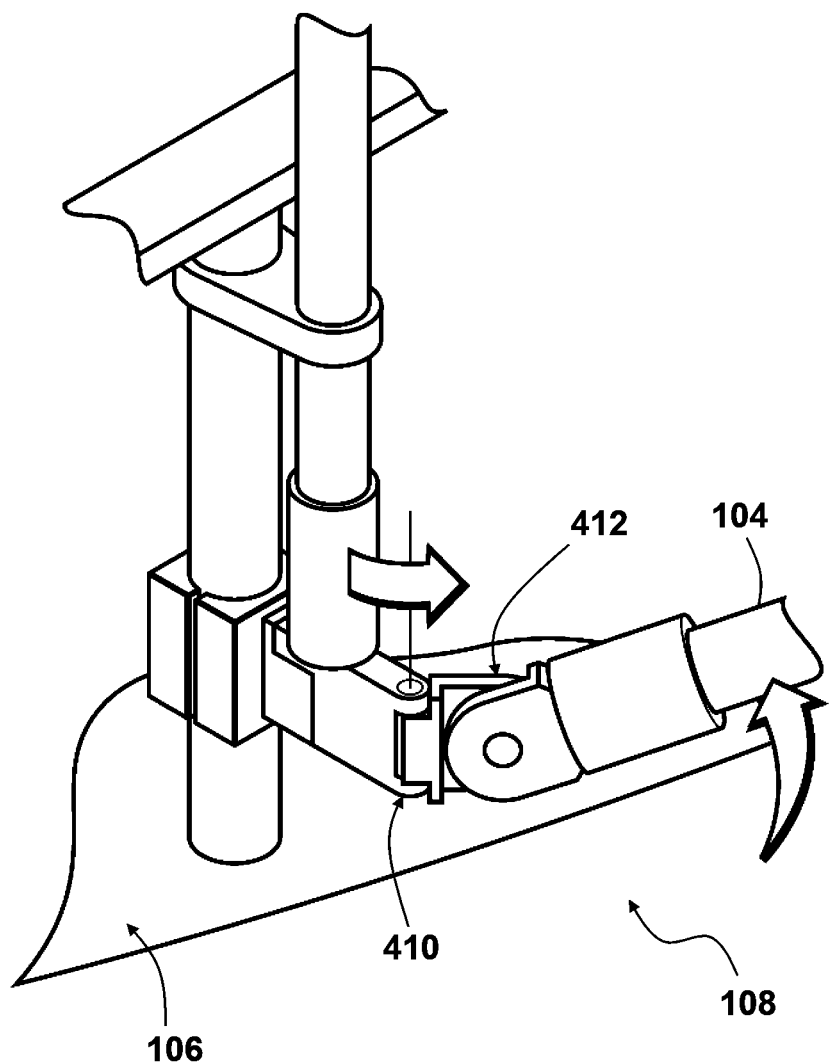
FIG. 4B depicts the exemplary gooseneck connector of FIG. 4A showing vertical and horizontal rotation of the boom.

FIG. 4B depicts the exemplary gooseneck connector 108 of FIG. 4A showing vertical and horizontal rotation of the boom 104. The weight of the boom 104 may dynamically absorb the energy of the SUAV as it impacts the triangular net based on how high the boom 104 is rotated vertically, via the horizontal hinge 412; how far the boom 104 is rotated horizontally, via the vertical hinge 410; and/or how much the boom 104 is progressively flexed from its first position before SUAV impact.

Figure 5A:
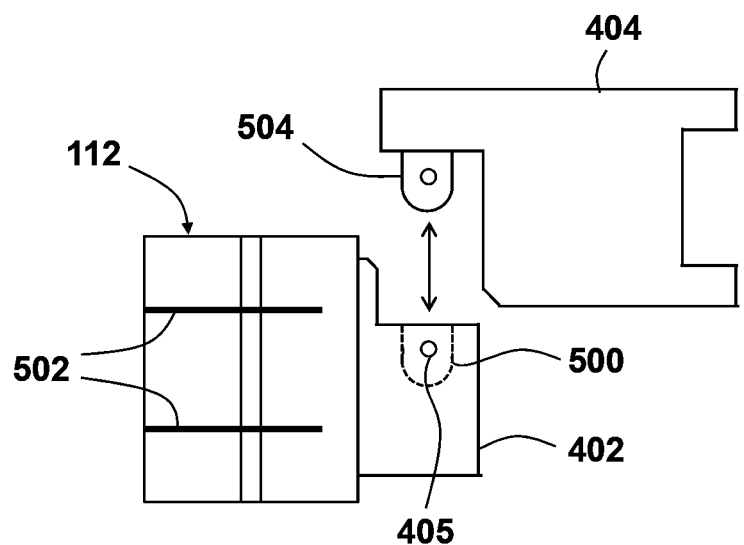
FIG. 5A depicts a quick release system between the exemplary lower clamp and the gooseneck connector quick release block with an indentation in the clamp quick release block shown with dashed lines.

FIG. 5A depicts a quick release system between the exemplary lower clamp 112 and the gooseneck connector quick release block 404 with an indentation 500 in the clamp quick release block 402 shown with dotted lines. The lower clamp 112 may be detachably attached to a stanchion, e.g., via one or more screws 502. The lower clamp may be fixedly attached to the clamp quick release block 402. In some embodiments, the clamp and quick release block may be a single part. The gooseneck connector quick release block 404 may have a protrusion 504 sized to fit in the indentation 500 of the clamp quick release block 402. Once the protrusion 504 is in the indentation 500, the quick release pin 405 may be inserted to secure the gooseneck connector quick release block 404 to the clamp quick release block 402. The gooseneck connector quick release block 404 may be removed from the clamp quick release block 402 by removing the quick release pin 405 and lifting the gooseneck connector quick release block 404 up and away from the clamp quick release block 402. The gooseneck connector quick release block 404 and/or clamp quick release block 402 may have one or more angled, or curved, edges to assist in connection and/or removal. The protrusion 504 and/or indentation 500 may have one or more corresponding curved, or angled, edges to assist in insertion and/or removal of the protrusion 504 from the indentation 500.

Figure 5B:
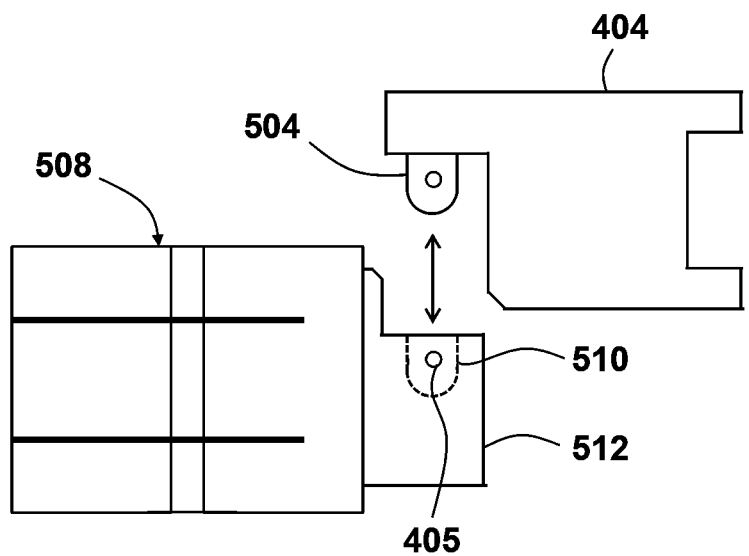
FIG. 5B depicts a quick release system between a second lower clamp sized for a different stanchion and the gooseneck connector quick release block shown in FIG. 5A with a second indentation in the second clamp quick release block shown with dashed lines.

FIG. 5B depicts a quick release system between a second lower clamp 508 sized for a different stanchion and the gooseneck connector quick release block 404 shown in FIG. 5A with a second indentation 510 in the second clamp quick release block 512 shown with dotted lines. Some ships may have different sized stanchions that require different clamps to accommodate them. The second lower clamp 508 may be used to attach the system to a different sized stanchion than the lower clamp (112, See FIG. 5A). In some embodiments, a second upper clamp (not shown) may be used with the corresponding second lower clamp 508 to fit different sized stanchions. The gooseneck connector quick release block 404 may be connected to the second quick release block 512 by inserting the protrusion 504 into the second indentation 510 and securing the connection via the quick release pin 405. By using a standard size for the protrusion 504 and accompanying indentations, the system may be attached to various stanchions by utilizing various lower clamps sized to accommodate various stanchions.

Figure 6:
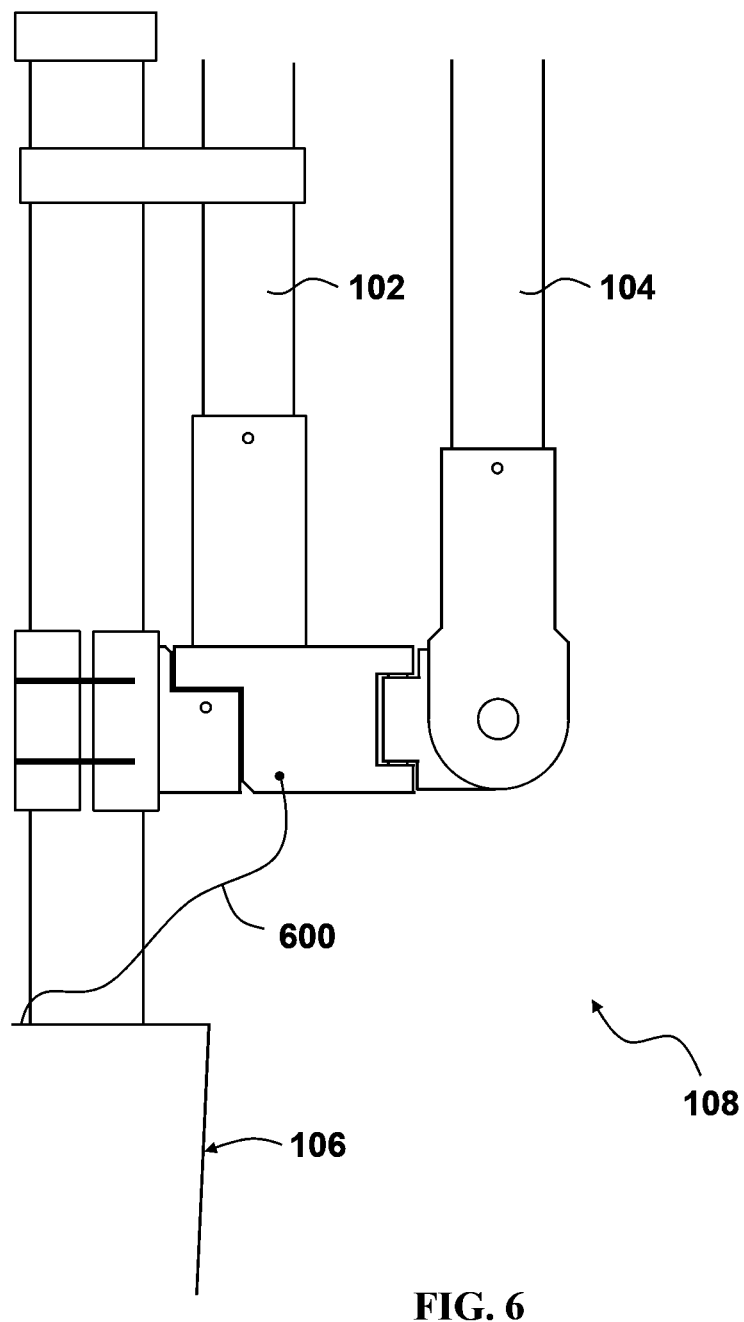
FIG. 6 depicts the system in a stored state with the mast and boom extending vertically and a tether attached from the gooseneck connector to another portion of the ship.

FIG. 6 depicts the system in a stored state with the mast 102 and boom 104 extending vertically and a tether 600 attached from the gooseneck connector 108 to another portion of the ship 106. The system may be placed in the stored state as long as the weather conditions do not exceed a threshold, e.g., World Meteorological Organization (WMO) sea state four conditions in which wave height is between 1.25 meters and 2.5 meters. In bad weather conditions, e.g., above WMO sea state four, the system may be detached, via the quick release (See FIGS. 5A-5B), and stored on the ship 106. The system may be secured with a tether 600 connected between a portion of the gooseneck connector, i.e., the gooseneck connector quick release block, horizontal hinge, and/or vertical hinge, to another portion of the ship 106, e.g., a vertical railing stanchion on the ship 106. In some embodiments, the system may be stored in a carry bag and the tether 600 may act as a carrying handle, with tether connected between the gooseneck connector 108 and a connector on an outside of the carry bag.

Figure 7:
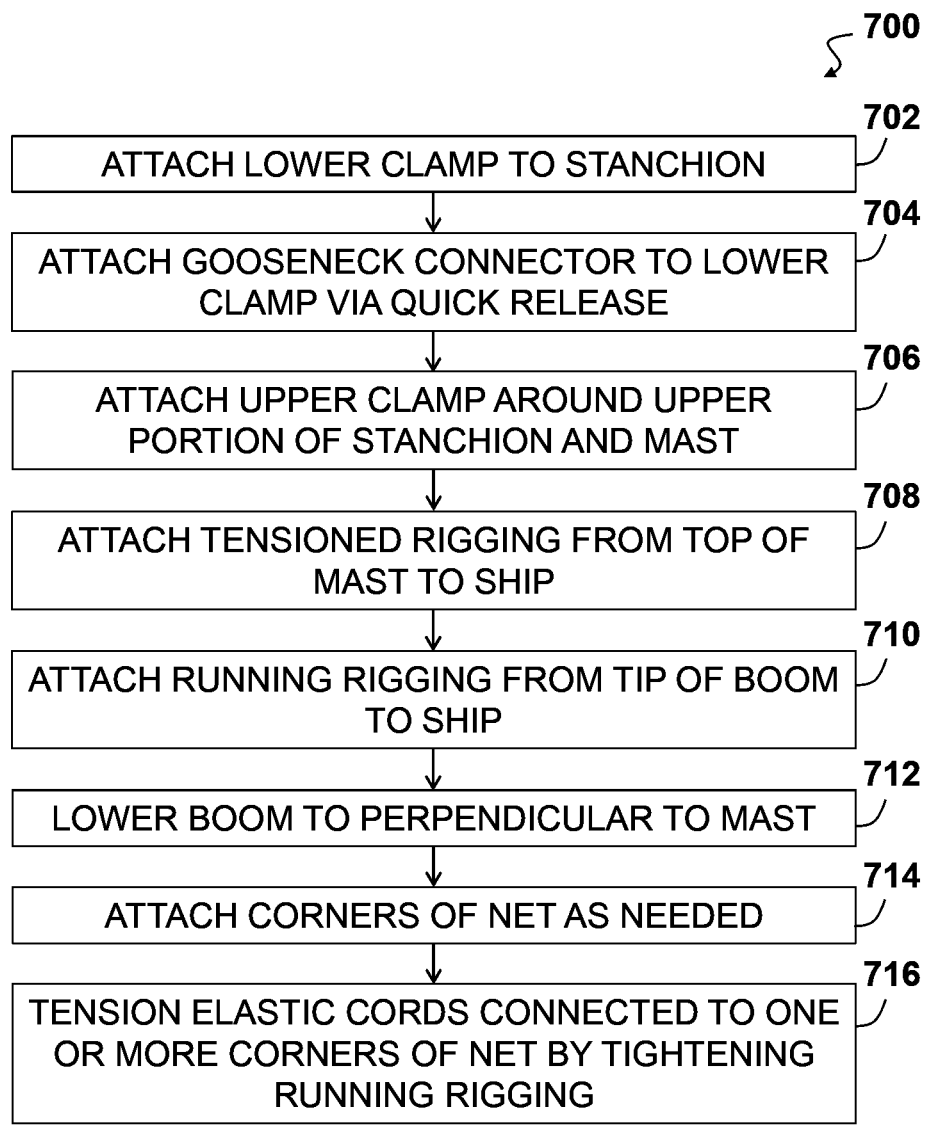
FIG. 7 is a flowchart of a setup of an exemplary embodiment of the SUAV shipboard recovery system.

FIG. 7 is a flowchart of a setup of an exemplary embodiment of the SUAV shipboard recovery system 700. The lower clamp may be attached to a stanchion, e.g., a vertical railing on the perimeter of the ship's deck (step 702). Next, the gooseneck connector may be attached to the lower clamp via a quick release (step 704). In some embodiments, gooseneck connector may be directly connected to the lower clamp, but this may require an individual to support the weight of the system while the lower clamp is attached. The upper clamp may be attached around an upper portion of the stanchion and mast (step 706). The upper clamp may be used to provide additional stability to the system, especially during storage (See FIG. 6). In some embodiments, the upper clamp may not be needed and the lower clamp may be the only point of contact between the system and the stanchion of the ship. Tensioned rigging may be attached from a top of the mast to the ship to provide support to the mast (step 708). Running rigging may be attached from the tip of the boom to the ship (step 710). In some embodiments, portions of the tensioned rigging and/or running rigging may be integrated into the edge of the net and may already be attached to corresponding components in the system. The boom may be retracted perpendicular to the mast (step 712). In embodiments where the system is attached to a stanchion on a ship, the boom may extend over an edge of the ship and perpendicular to the ship's side. Corners of the net may be attached as needed (step 714). Certain corners of the net may already be attached via the running rigging and/or tensioned rigging. In some embodiments, the corners of the net may be attached with elastic cords, e.g., bungee cords. The elastic cords may be tensioned by tightening the running rigging (step 716).

Figure 8:
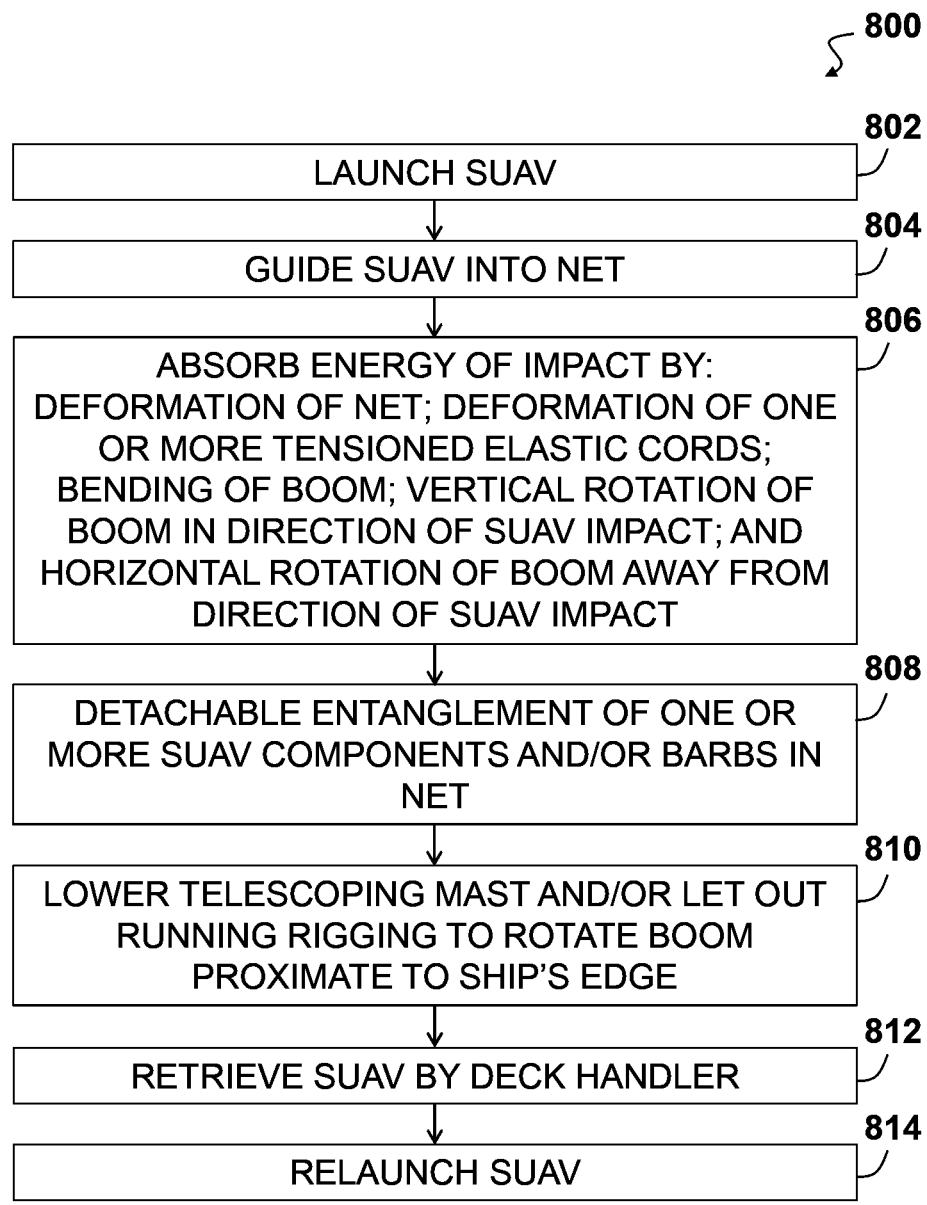
FIG. 8 is a flowchart of an exemplary embodiment of the SUAV shipboard recovery system.

FIG. 8 is a flowchart of an exemplary embodiment of the SUAV shipboard recovery system 800. The SUAV may be launched (step 802). The SUAV may be launched from the ship having the recovery system or from another ship or object. The SUAV may be guided into the net (step 804). The energy of the SUAV impact may be progressively absorbed by: deformation of the net; deformation of one or more tensioned elastic cords; bending of the boom; vertical rotation of the boom in the direction of SUAV impact; and horizontal rotation of the boom away from the direction of SUAV impact (step 806). The SUAV may be secured in the net by detachable entanglement of one or more SUAV components and/or barbs (step 808). To retrieve the SUAV, the telescoping mast may be lowered and/or the running rigging may be let out to rotate boom proximate to ship's deck's edge (step 810). The SUAV may be retrieved by the deck handler (step 812). As the SUAV may only be slightly entangled and/or attached via one or more barbs, the time required to remove the SUAV from the net is far less than if the SUAV were completely tangled in the net. If desired, the SUAV may be quickly relaunched, e.g., within approximately thirty seconds of impact with the net (step 814).

The exemplary SUAV shipboard recovery system may be disposed over the side of a moving ship such that turbulence from the ship structure is minimized. The ship may be moving in a windward direction such that the net billows out towards an aft of the ship. This positioning ensures that the speed differential at the time of impact, i.e., closing speed, is reduced. This positioning may also ensure that the net has a greater effective mass, and further reduce the impact into the net.

It is contemplated that various combinations and/or subcombinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further it is intended that the scope of the present invention is herein disclosed by way of examples and should not be limited by the particular disclosed embodiments described above.

What is claimed is:

1. A method comprising:
   impacting, by a small unmanned aerial vehicle (SUAV), a net having at least three sides; and
   converting the kinetic energy of the SUAV into at least one of: elastic potential energy of one or more tensioned elastic cords connected to the net, gravitational potential energy of a frame member connected to the net, rotational kinetic energy of the frame member connected to the net, and elastic potential energy of the frame member connected to the net;
   wherein the frame member is connected to a connector having a vertical hinge and a horizontal hinge; and
   wherein a second elongate frame member is stationary and connected at the connector.

2. The method of claim 1 further comprising:
   securing the SUAV in the net after converting the kinetic energy of the SUAV by detachable entanglement of the SUAV in the net.

3. The method of claim 2 wherein securing the SUAV in the net further comprises:
   detachably entangling at least one barb in the net, wherein the at least one barb is disposed on a fuselage of the SUAV.

4. The method of claim 1 wherein at least one corner of the net is connected to a portion of a ship.

5. The method of claim 4 further comprising:
   removing, by a deck handler on the ship, the SUAV from the net.

6. The method of claim 1, wherein the frame member is a boom.

7. The method of claim 6 further comprising:
   rotating the boom to a location proximate to an edge of a ship.

8. The method of claim 1, wherein the second frame member is a mast and the net is connected to the mast.

9. The method of claim 8 further comprising:
   lowering the mast telescopically.

10. The method of claim 1 further comprising:
    reducing, prior to impact, a closing speed of the SUAV.

11. The method of claim 10 wherein reducing the speed of the SUAV further comprises cutting power to a propeller of the SUAV.

12. A small unmanned aerial vehicle (SUAV) recovery system comprising:
    a net having at least three corners; and
    a boom connected to at least one corner of the net; and
    a mast, wherein the mast is stationary;
    a connector, wherein the mast and the boom are connected at the connector;
    wherein energy of an impact of the SUAV into the net is progressively transferred by at least one of: a vertical rotation of the boom in a direction towards the impact of the SUAV, and a horizontal rotation of the boom in a direction away from the impact of the SUAV.

13. The SUAV recovery system of claim 12 wherein energy of the impact of the SUAV is also transferred by deformation of the net.

14. The SUAV recovery system of claim 12 wherein energy of the impact of the SUAV is also transferred by a progressive bending of the boom.

15. The SUAV recovery system of claim 12 further comprising:
    one or more tensioned elastic cords attached to at least one corner of the net;
    wherein energy of the impact of the SUAV is also transferred by deformation of the one or more tensioned elastic cords.

16. The SUAV recovery system of claim 12 further comprising:
- three or more rings attached to the perimeter of the net; and
- three or more lines, wherein each side of the net is slidably connected to one of the three or more lines by one or more of the three or more rings.

17. The SUAV recovery system of claim 12, wherein the mast is oriented perpendicular to the boom, and wherein the mast and the boom are telescopically adjustable in length.

18. The SUAV recovery system of claim 12 wherein a square mesh size of the net is smaller than a cross-sectional size of a fuselage of the SUAV.

19. The SUAV recovery system of claim 12 further comprising:
- one or more barbs disposed on a fuselage of the SUAV, wherein the one or more barbs are sized to detachably entangle in the net after impact.

* * * * *